US006786254B1

(12) United States Patent
Kralick

(10) Patent No.: US 6,786,254 B1
(45) Date of Patent: Sep. 7, 2004

(54) RETRACTABLE AIR SUPPLY CONNECTOR SYSTEM FOR A FUEL CELL ASSEMBLY

(75) Inventor: James H. Kralick, Albany, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/429,580

(22) Filed: May 5, 2003

(51) Int. Cl.[7] .............................. B65B 1/04; B65B 3/04; B67C 3/00

(52) U.S. Cl. ........................... 141/287; 141/44; 141/64; 141/349; 429/120

(58) Field of Search .............................. 141/37, 44, 54, 141/64, 287, 348, 349; 429/17, 19, 25, 26, 54, 120

(56) References Cited

U.S. PATENT DOCUMENTS 5,324,597 A * 6/1994 Leadbetter et al. ........... 429/62

* cited by examiner

*Primary Examiner*—Timothy L. Maust
(74) *Attorney, Agent, or Firm*—Paul L. Marshall

(57) ABSTRACT

In a retractable air supply connection system for air supply lines extending between a blower supply plenum and hot zone components of a solid-oxide fuel cell assembly, each such hot zone component is provided with a socket for receiving a retractable connector. Each connector has first and second concentric expandable bellows connected between the plenum and a nipple element having a central passage and nipple for mating with the socket. The inner bellows is coaxial with the socket element and is connected to an individual supply port in the plenum for the particular hot zone component. The outer bellows is connected to the main blower output. A return spring between the hot zone component and the nipple element urges the nipple element from the socket to disconnect the supply line from the hot zone by collapsing the outer bellows to break the conductive heat path when the blower is inoperative.

5 Claims, 2 Drawing Sheets

10'
20b
50
34b
42b
40b
38
48
14b
18b
36b
49
46b
12b
62b
60
12a
62a
32

14a
46a
19b
20a
18a
42a
40a
36a
19a
34a
31a
31b

RETRACTABLE AIR SUPPLY CONNECTOR SYSTEM FOR A FUEL CELL ASSEMBLY

TECHNICAL FIELD

The present invention relates to fuel cells; more particularly, to supply air connections to fuel cell assemblies; and most particularly, to a system for automatically connecting and disconnecting an air supply to a fuel cell assembly in response to manifold air pressure.

BACKGROUND OF THE INVENTION

Fuel cells which generate electric current by controllably combining elemental hydrogen and oxygen are well known. In one form of such a fuel cell, an anodic layer and a cathodic layer are separated by a permeable electrolyte formed of a ceramic solid oxide. Such a fuel cell is known in the art as a "solid-oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{31\ 2}$ ions catalytically by the cathode. The oxygen ions diffuse through the electrolyte and combine at the anode/electrolyte interface with four hydrogen ions to form two molecules of water. The anode and the cathode are connected externally through the load to complete the circuit whereby four electrons are transferred from the anode to the cathode. When hydrogen is derived by "reforming" hydrocarbons such as gasoline in the presence of limited oxygen, the "reformate" gas includes CO which is converted to $CO_2$ at the anode. Reformed gasoline is a commonly used fuel in automotive fuel cell applications.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack.

In a solid-oxide fuel cell system, the "hot" components, e.g., the fuel cell stacks, the fuel reformer, tail gas combuster, heat exchangers, and fuel/air manifold, are contained in a "hot zone" within an insulative thermal enclosure. The thermal enclosure is intended specifically for minimizing heat transfer to its exterior and has no significant structural or protective function for its contents. A separate and larger structural enclosure surrounds the thermal enclosure, defining a "cool zone" outside the thermal enclosure for incorporation of "cool" components, e.g., the air supply system and the electronic control system. The structural enclosure components are known in the art as a "plant support module" (PSM).

Process air is directed to the fuel cell reformer and stacks typically via a manifold in the cool zone having a plurality of independently-controllable air valves for metering air as needed to a plurality of process locations and functions in the hot zone. The plenum is connected to the hot zone components via tubes, which tubes can become sufficiently hot to preclude use of low-cost materials such as rubber hoses. This condition pertains especially during shutdown of the fuel cell system when the tubes are not cooled by passage of incoming air through them. During normal operation of the system, there typically is sufficient active cooling of these tubes to permit use of low-cost materials.

Further, when the fuel cell system is in idle mode, it is desirable to retain high temperatures within the hot zone to permit rapid restart. The air supply tubes connected to the hot zone components are significant pathways for loss of heat by conduction.

What is needed is means for permitting use of low-cost materials such as rubber for air supply tubes connecting to the hot zone of an SOFC.

What is further needed is means for preventing loss of heat from the hot zone during idle mode by heat conduction through air supply tubes.

It is a principal object of the present invention to permit use of low-cost materials such as rubber for air supply tubes connecting to the hot zone of an SOFC.

It is a further object of the invention to prevent loss of heat from the hot zone during idle mode by heat conduction through air supply tubes.

SUMMARY OF THE INVENTION

Briefly described, air supply lines extending between a blower supply plenum to hot zone components of a solid-oxide fuel cell assembly are provided with means for automatically connecting the lines to, and retracting the lines from, the hot zone components. Each such hot zone component is provided with a socket, preferably hemispherical, for receiving a connector. Each such supply line comprises a connector having two concentric expandable bellows connected between the plenum and a nipple element having a central bore and nipple for mating with the socket. The inner bellows is coaxial with the socket and is connected to an individual supply port for the particular hot zone component. The outer bellows is connected to the main blower output. A return spring between the hot zone component and the nipple element urges the element from the socket, thereby disconnecting the supply line from the hot zone and breaking the conductive heat path when the blower is inoperative as during idle mode or shutdown. When the blower is re-energized, the outer bellows is pressurized and accordingly expands axially, overcoming the return spring, extending the inner bellows, and automatically urging the nipple element back into air-tight connection with the socket.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
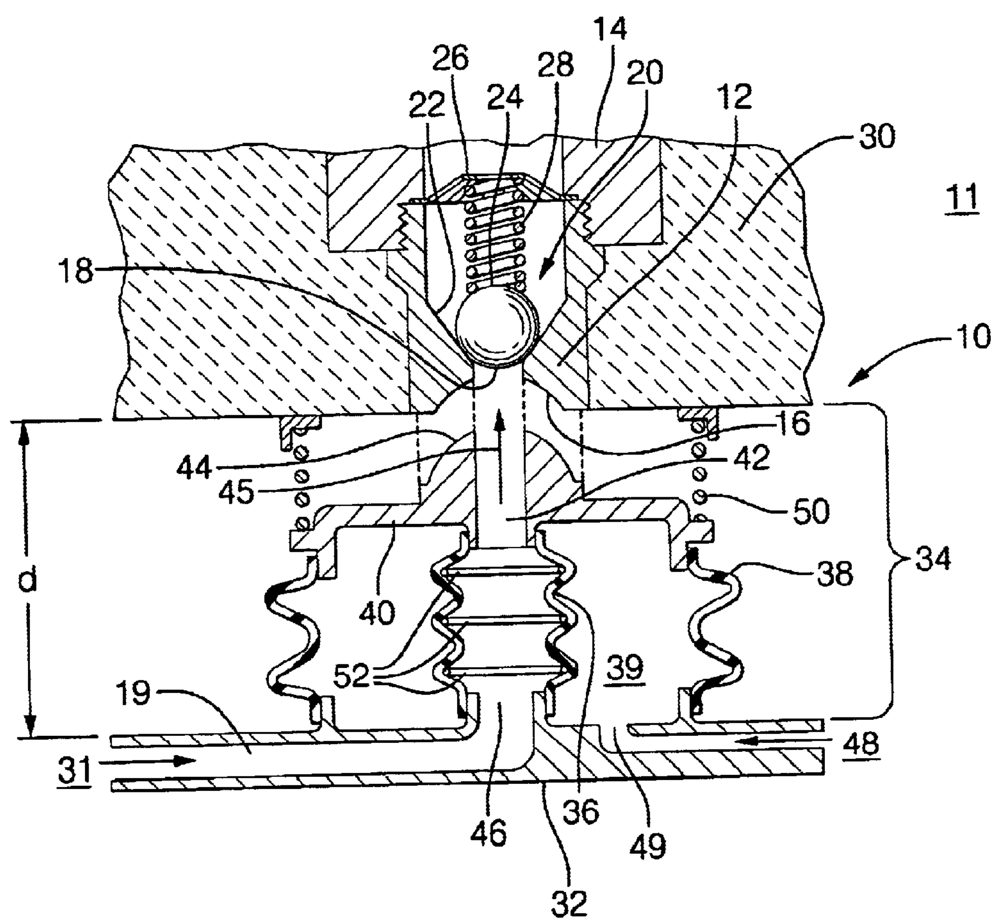
FIG. 1 is a cross-sectional view of a hot zone component socket and retractable nipple arrangement in accordance with the invention.

Referring to FIG. 1, a retractable connector system 10 in accordance with the invention, used in a fuel cell assembly schematically shown as numeral 11, includes a socket element 12, preferably a socket, threadedly (in this example) disposed into a hot zone component 14 of a fuel cell assembly, for example, an inlet port for a cathode air heat exchanger (not shown). Socket element 12 includes a recessed first seat 16 which preferably is spherical as shown or conical surrounding a passage 18 for admitting air 19 from a process air source into component 14. Preferably although not necessarily, a conventional check valve assembly 20 is disposed within element 12 for preventing outflow of hot gases from within the hot zone while system 10 is in retraction mode. Assembly 20 includes a second seat 22 formed in element 12, preferably conical, and a ball 24 disposable against seat 22 to form a seal. Ball 24 is displaceable away from seat 22 to open the check valve in known fashion by the force of entering air during operation of the fuel cell assembly. A spider 26 is disposed in element 12 for retaining ball 24. A closing spring 28 having appropriate spring force may be included between spider 26 and ball 24 to permit used of the invention in orientations other than those wherein ball 24 may be seated by gravity. Hot zone component 14 is thermally isolated by an insulative thermal shell 30.

Adjacent shell 30 and fixedly offspaced therefrom at a distance d is a supply air plenum 32 connectable via supply line 31 to a source of process air, for example, an air pump or blower (not shown). Each such supply line 31 for each hot zone component 14 in a fuel cell assembly comprises a connector 34 having inner and outer concentric expandable bellows 36,38 connected between plenum 32 and a nipple element 40 having a central passage 42 and nipple 44 for mating with socket seat 16 and passage 18. Nipple 44 is preferably spherical to match the preferred shape of seat 16. Inner bellows 36 is coaxial with the socket seat 16 and is connected to an air supply port 46 in the plenum for supplying air for the particular hot zone component 14. Outer bellows 38 is connected directly to the main blower output 48 via port 49. A return spring 50 between thermal enclosure 30 or socket element 12 and nipple element 40 urges element 40 from socket element 12 whenever the blower is inoperative, thereby automatically disconnecting and retracting supply line 31 from the hot zone element and closing check valve 20 as during idle mode or shutdown. Such retraction breaks the conductive heat path through the air supply line to conserve heat in the hot zone, which also permits use of low-cost materials for the supply line. When the blower is re-energized as at start-up or re-start, outer bellows 38 becomes pressurized in annular space 39 and accordingly expands axially, overcoming return spring 50 and extending inner bellows 36, and automatically urging nipple 44 back into air-tight connection with socket seat 16 to provide a flow path 45 for process air 19 to flow to component 14. Preferably, inner bellows 36 is provided with support rings 52 within the corrugations thereof to prevent collapse of inner bellows 36 from possible differential pressure between ports 46 and 49.

Figure 2:
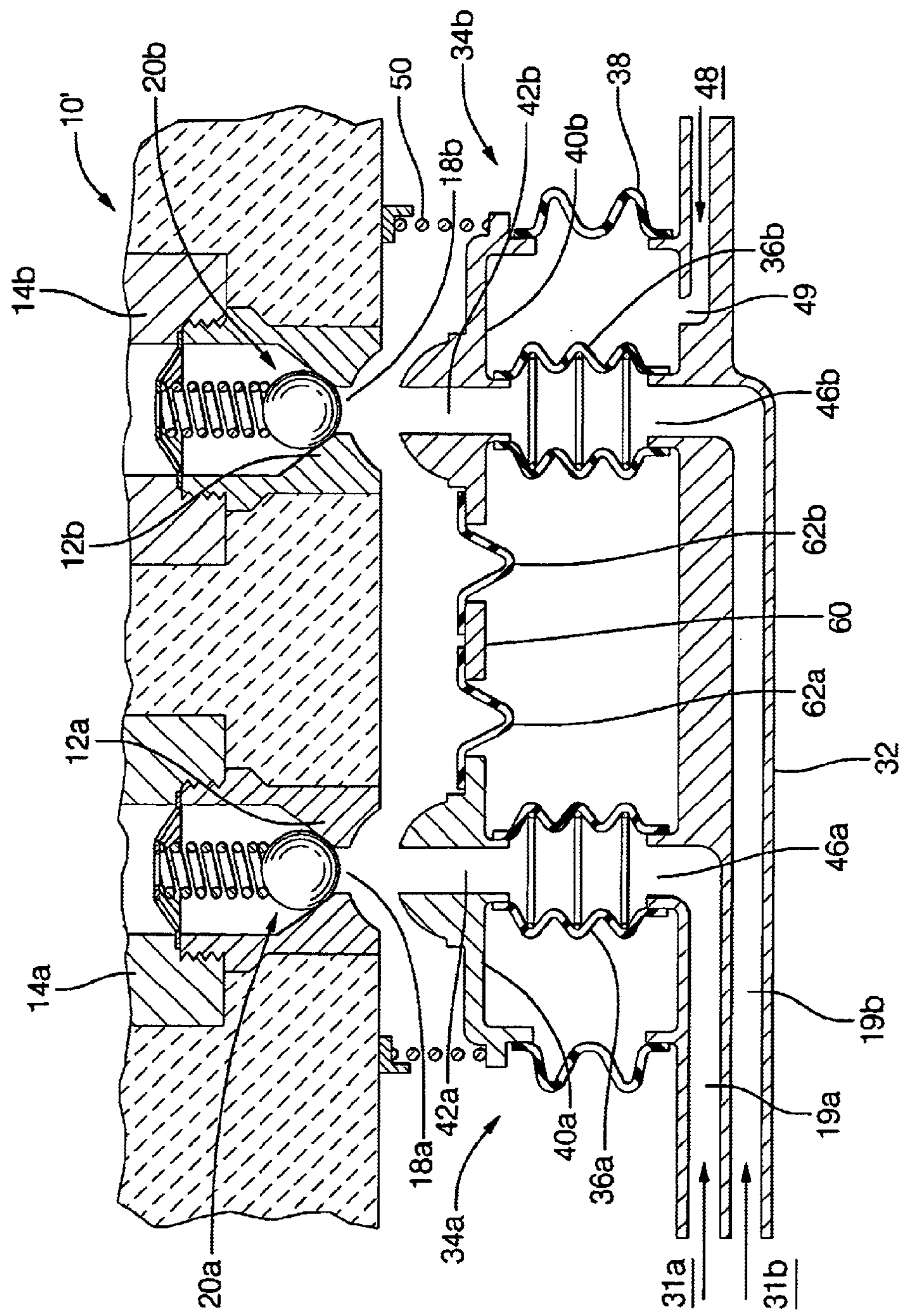
FIG. 2 is a cross-sectional view like that shown in FIG. 1 but configured for a plurality of hot zone components.

Referring to FIG. 2, a plurality of hot zone components 14*a*,14*b* may be accommodated in ganged fashion as shown in retractable connector system 10' in accordance with the invention. First and second connectors 34*a*,34*b* comprise first and second inner bellows 36*a*,36*b* connected between respective first and second supply ports 46*a*,46*b*, for first and second air supply lines 31*a*,31*b* respectively, and first and second nipple elements 40*a*, 40*b*. The first and second nipple elements are connected via a rigid connecting element 60 and lateral alignment bellows 62*a*,62*b*. A single outer bellows 38' surrounds the first and second inner bellows 36*a*, 36*b* and is supplied by air supply port 49. Bellows 38' may be round or rectangular in cross-section. Socket elements 12*a*,12*b*, check valve assemblies 20*a*,20*b*, hot zone components 14*a*,14*b*, passages 18*a*,18*b* for admitting air into components 14*a*,14*b*, and nipple element passages 42*a*,42*b* are preferably as described for FIG. 1. The engaging and retracting actions of the two connectors 34*a*,34*b* are in parallel and function as described for the single connector 34 above.

Of course, it should be appreciated for all embodiments of connector systems in accordance with the invention that the spherical mating shapes of socket seat 16 and nipple 44 may be reversed or otherwise altered in numerous ways as may occur to one of skill in the art, and all such shapes are comprehended by the invention.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A retractable air supply connector system for a fuel cell assembly, comprising:

a) a socket element defining a process air passage for a fuel cell assembly component;

b) an air plenum offspaced from said socket element, and c) an air supply connector having i) a nipple element having means for mating with said socket element and having a passage for connecting with said process air passage in said socket element, ii) an inner bellows disposed between a first port in said plenum connectable to a source of process air and said passage in said nipple element, and iii) an outer bellows surrounding said inner bellows and disposed between a second port in said plenum and said nipple element, said inner bellows being axially extendable and defining a flow path for said process air to said nipple passage, and said second port being selectively connectable to a source of pressurized air for selectively inflating said outer bellows to cause said nipple element to mate selectively with said socket element.

2. A system in accordance with claim 1 further comprising a return spring disposed between said socket element and said nipple element to retract said nipple element from said socket element when said source of pressurized air is interrupted.

3. A system in accordance with claim 2 wherein said socket element further comprises a check valve for preventing back flow of said process air from said fuel cell assembly component to said connector.

4. A system in accordance with claim 1 further comprising supportive rings within said inner bellows.

5. A system for providing a retractable first and second air supply connectors from an air supply plenum to first and second fuel cell assembly components, comprising:

a) first and second socket elements defining first and second process air passages for said first and second fuel cell assembly components, respectively;

b) first and second process air supply ports in said air supply plenum;

c) said first and second air supply connectors, each having i) a nipple element having means for mating with said respective socket element and having a passage for connecting with said respective process air passage in said respective socket element, and ii) an inner bellows disposed between said respective first and second air supply port in said plenum connectable to a respective source of process air and said respective passage in said nipple element; and d) an outer bellows surrounding said first and second inner bellows and disposed between a source of pressurized air and said nipple elements for selectively inflating said outer bellows to cause said first and second nipple elements to mate selectively with said respective first and second socket elements.

* * * * *